US012071599B2

(12) United States Patent
Watson

(10) Patent No.: US 12,071,599 B2
(45) Date of Patent: Aug. 27, 2024

(54) CONCENTRATED LAUNDRY CLEANING COMPOSITIONS IN UNIT DOSE PACKETS OR POUCHES

(71) Applicant: Korex Canada Company, Etobicoke (CA)

(72) Inventor: Douglas Robert Watson, Toronto (CA)

(73) Assignee: KOREX CANADA COMPANY, Ontario (CA)

( * ) Notice: Subject to any disclaimer, the term of this patent is extended or adjusted under 35 U.S.C. 154(b) by 26 days.

(21) Appl. No.: 17/524,793

(22) Filed: Nov. 12, 2021

(65) Prior Publication Data

US 2022/0154100 A1 May 19, 2022

Related U.S. Application Data

(60) Provisional application No. 63/113,387, filed on Nov. 13, 2020.

(51) Int. Cl.

| | |
|---|---|
| ***C11D 1/14*** | (2006.01) |
| ***C11D 1/722*** | (2006.01) |
| ***C11D 1/831*** | (2006.01) |
| ***C11D 3/20*** | (2006.01) |
| ***C11D 3/30*** | (2006.01) |
| ***C11D 3/386*** | (2006.01) |
| ***C11D 3/43*** | (2006.01) |
| ***C11D 9/26*** | (2006.01) |
| ***C11D 10/04*** | (2006.01) |
| ***C11D 11/00*** | (2006.01) |
| ***C11D 17/04*** | (2006.01) |

(52) U.S. Cl.

CPC .............. *C11D 1/143* (2013.01); *C11D 1/722* (2013.01); *C11D 1/831* (2013.01); *C11D 3/2096* (2013.01); *C11D 3/30* (2013.01); *C11D 3/38627* (2013.01); *C11D 3/38636* (2013.01); *C11D 3/38645* (2013.01); *C11D 3/38663* (2013.01); *C11D 3/43* (2013.01); *C11D 9/267* (2013.01); *C11D 10/042* (2013.01); *C11D 10/045* (2013.01); *C11D 17/045* (2013.01); *C11D 2111/12* (2024.01)

(58) Field of Classification Search

CPC ....... C11D 1/143; C11D 1/722; C11D 3/2096; C11D 17/045; C11D 10/042

See application file for complete search history.

(56) References Cited

U.S. PATENT DOCUMENTS

| | | | | |
|---|---|---|---|---|
| 4,265,790 A | | 5/1981 | Winston et al. | |
| 4,427,417 A | | 1/1984 | Porasik | |
| 4,728,455 A | | 3/1988 | Rerek | |
| 4,876,023 A | | 10/1989 | Dickenson et al. | |
| 4,891,160 A | | 1/1990 | Vander Meer | |
| 4,973,416 A | * | 11/1990 | Kennedy | C11D 17/043 510/303 |
| 5,080,848 A | | 1/1992 | Strauss | |
| 5,152,932 A | | 10/1992 | Mueller | |
| 5,198,145 A | | 3/1993 | Lobunez | |
| 5,468,411 A | | 11/1995 | Dixit et al. | |
| 5,534,178 A | | 7/1996 | Bailly et al. | |
| 5,693,602 A | | 12/1997 | Draiper et al. | |
| 5,807,817 A | | 9/1998 | Mazzola et al. | |
| 5,914,307 A | | 6/1999 | DeNome et al. | |
| 5,945,394 A | * | 8/1999 | Sajic | C11D 1/28 560/147 |
| 5,955,415 A | * | 9/1999 | Gutierrez | C11D 3/394 510/303 |
| 6,204,234 B1 | | 3/2001 | Herbots et al. | |
| 6,680,288 B1 | | 1/2004 | Groot | |
| 6,818,605 B1 | | 11/2004 | Ban et al. | |
| 9,464,261 B2 | * | 10/2016 | Nekmard | C11D 3/3723 |
| 10,358,620 B2 | * | 7/2019 | Prasad | C11D 1/22 |
| 2002/0137648 A1 | | 9/2002 | Sharma et al. | |
| 2002/0169092 A1 | | 11/2002 | Alexandre Catlin et al. | |
| 2002/0187909 A1 | * | 12/2002 | Gupta | C11D 17/043 510/312 |
| 2003/0092595 A1 | | 5/2003 | Romero et al. | |
| 2008/0009430 A1 | * | 1/2008 | Hecht | C11D 1/83 510/352 |
| 2010/0190677 A1 | | 7/2010 | Esposito et al. | |
| 2012/0122747 A1 | * | 5/2012 | Nekmard | C11D 1/28 510/276 |
| 2017/0175056 A1 | * | 6/2017 | Watson | C11D 3/3917 |

(Continued)

FOREIGN PATENT DOCUMENTS

| | | | | |
|---|---|---|---|---|
| WO | WO-2011143602 A1 | * | 11/2011 | C11D 1/28 |
| WO | WO-2016111884 A2 | * | 7/2016 | C11D 1/143 |
| WO | WO-2016160407 A1 | * | 10/2016 | |

OTHER PUBLICATIONS

Grohmann, "Hygiene Effects of Bleach Systems in Laundry Detergents"; SOFW Journal; Oct. 2011; pp. 1-7.

*Primary Examiner* — Liam J Heincer

*Assistant Examiner* — M. Reza Asdjodi

(74) *Attorney, Agent, or Firm* — DINSMORE & SHOHL LLP

(57) ABSTRACT

An article includes a unit dose packet of a concentrated cleaning composition for cleaning laundry. The concentrated cleaning composition comprising a nonionic surfactant, fatty acid methyl ester sulfonate, fatty acid soap, one or a plurality of enzymes, and a solvent system. The cleaning composition is compatible with polyvinyl alcohol film. The unit dose packet includes the concentrated laundry cleaning composition disposed in a single chamber, dual chamber, or multi-chamber unit dose packet having a total weight of the concentrated cleaning composition of from 15 grams to 30 grams.

20 Claims, No Drawings

(56) References Cited

U.S. PATENT DOCUMENTS

| | | | | |
|---|---|---|---|---|
| 2017/0369816 | A1* | 12/2017 | Holland | C11D 1/29 |
| 2019/0161706 | A1* | 5/2019 | Watson | C11D 1/72 |
| 2020/0362268 | A1* | 11/2020 | Watson | C11D 3/10 |
| 2021/0230519 | A1* | 7/2021 | Watson | C11D 1/83 |
| 2021/0277338 | A1* | 9/2021 | Watson | C11D 1/825 |
| 2022/0154100 | A1* | 5/2022 | Watson | C11D 10/042 |

* cited by examiner

CONCENTRATED LAUNDRY CLEANING COMPOSITIONS IN UNIT DOSE PACKETS OR POUCHES

CROSS-REFERENCE TO RELATED APPLICATION

This application claims the benefit of priority under 35 U.S.C. § 119(e) to U.S. Provisional Patent Application Ser. No. 63/113,387, filed on Nov. 13, 2020, entitled “Concentrated Bio-Based Laundry Cleaning Compositions in Unit Dose Packets or Pouches,” the entire contents of which are incorporated by reference in the present disclosure.

TECHNICAL FIELD

The present disclosure is directed to concentrated laundry cleaning compositions in unit dose packets or pouches.

BACKGROUND

There are currently numerous laundry liquid and liquid plus powder chambered unit dose laundry wash products on the market. These products are conventionally sold in polyvinyl alcohol film unit dose formats for ease of use. These products are generally not formulated to address acute oral toxicity or environmental sustainability, due to the use of petrochemical based surfactants and other chemicals of high oral toxicity, and commonly the use of ethoxylated surfactants that are subsequently sulfated to form alcohol ethoxylated sulfates containing residual 1,4-dioxane, which is a very strong carcinogen and is under increased scrutiny and tighter regulatory restrictions.

SUMMARY

The present disclosure is directed to liquid laundry cleaning compositions comprised of a high performance synergistic blend of fatty acid derived surfactants and enzymes, specifically, (1) a fatty alcohol ethoxylate, (2) fatty acid methyl ester sulfonate, (3) fatty acid soap or soaps, (4) one or more enzymes with enzyme stabilizers, and (5) a solvent(s) and/or hydrotrope(s) blend including both organic components and purified water. The cleaning compositions of the present disclosure can be incorporated into liquid laundry unit doses. The cleaning compositions can include other constituents, such as but not limited to fragrances, colorants, chelants, detersive polymers, anti-redeposition agent(s), optical brighteners, anti-dye transfer agents, color protection agents, and other fabric care detersive and conditioning agents. Such cleaning compositions can be processed into optically clear, chemically and physically stable liquids that are very compatible with polyvinyl alcohol film encased unit dose liquid laundry preparations. This combination can achieve a very high renewable carbon index to the overall formula, while maintaining performance at a high level and providing an overall human and aquatic safety profile that is superior to conventional formulations. The cleaning compositions disclosed herein can provide opportunities for concentration of active ingredients, by using more concentrated paste forms of the fatty acid methyl ester sulfonate. Enzyme stabilizers and pH control agents may be included in the cleaning compositions to maintain the integrity and effectiveness of constituents of the cleaning compositions.

Besides having a very high renewable carbon index level, the formulations of the cleaning compositions are lower in acute toxicity than common market products and have a very low 1,4-dioxane content. The use of the anionic surfactant-alkyl methyl ester sulfonate (MES)—can provide improved performance compared to commonly used dodecyl benzene sulfonates and natural sodium lauryl sulfate in terms of performance across water hardness levels, and the MES has reduced environmental impact compared to commonly used alcohol ethoxysulfates due to the absence of 1,4-dioxane in the MES. The MES also has a comparatively low acute oral toxicity rating. Additionally, the MES can be used as a solid or semi-solid in the preparation of the liquid cleaning compositions, which enables further concentration, unlike alcohol ethoxysulfates, which are generally in liquid form. The MES also may provide safer chemistry for laundry applications when compared to alpha olefin sulfonates in that the latter have residual sultone chemicals that can become reactive with bleaching chemicals used as adjuncts in the laundry washing process—such reaction products make chlorinated sultones in the wash, which are strong skin sensitizers. Additional surfactant performance and de-foaming in the wash can be accomplished with the use of a fatty acid based soap. Enzymes and enzyme stabilizers are incorporated into the formulation for additional stain removal. It has been discovered that, in addition to traditional enzyme stabilizers used in conventional commercial enzyme preparations, additionally added reducing agents may be included at the appropriate concentration, for the maintenance of amylase enzyme stability in the final product, due to the presence of residual oxidizing agents from the bleaching processes involved in the manufacture of many of these naturally derived surfactants.

DETAILED DESCRIPTION

The cleaning compositions disclosed herein are comprised of one or a plurality of fatty alcohol ethoxylated nonionic surfactants, one or a plurality of fatty acid methyl ester sulfonates (MES), a fatty acid based foam control agent (fatty acid soap), one or a plurality of enzymes, and one or a plurality of enzyme stabilizers. This combination of constituents provides good overall detergency, options for further concentration of active ingredients with less water content, lower acute toxicity, and very low residual 1,4-dioxane levels. Further, when using commercially-available naturally-derived ethoxylated fatty alcohols, renewable carbon index levels on such formulations can reach or exceed 90% or even 95%, providing sustainability, biodegradability and safety profiles that are better than conventional products. Optionally, numerous performance enhancing components and aesthetic agents can be incorporated, including, but not limited to chelants, detersive polymers, fragrance, colorants, pH control agents softening agents, preservatives, germicides and others.

Nonionic Surfactants

The concentrated cleaning compositions of the present disclosure include fatty alcohol ethoxylates in which the hydrophobic and the hydrophilic portions are both made from plant-based materials. The fatty acids are derived from natural sources and the ethylene oxide used to make the ethoxylated molecule is also derived from natural sources. Commercial forms of these naturally-derived nonionic surfactants, incorporating natural fatty sources and naturally derived ethylene oxide for the exthoxylated portion, include those from Solvay (formerly Rhodia), Tritex, and Croda Inc., among others.

Nonionic surfactants, primarily alcohol ethoxylates and alkoxylates, including plant-based and non-plant based materials, may also be included in the concentrated cleaning compositions, specifically for very hydrophobic oily soil removal. These nonionic surfactants generally may have a lower CMC and lower oil/water interfacial tension than most anionic surfactants. Melting point, dissolution rate, water solubility, oil/water interfacial tension and CMC may be considered in selection of nonionic surfactants. The degree of branching, the position and length of branches, the relative size of the hydrophobic and hydrophilic groups and the composition of the hydrophilic groups are all chemical variables impacting physical, chemical, and performance properties of the nonionic surfactants. Detergent alcohols used to make the alcohol ethoxylates can be primary or secondary alcohols with respect to the position of the hydroxyl (—OH) group. Narrow range ethoxylates can be used in the concentrated cleaning compositions for improved water solubility and performance as well. In embodiments, the concentrated cleaning compositions comprise fatty alcohol ethoxylates having a hydrophobic portion comprising any combination of chain lengths within the range of 8 to 16 carbon atoms and a hydrophilic portion comprising anywhere within the range from 3 moles to 12 moles of ethylene oxide. In embodiments, the concentrated cleaning compositions may include fatty alcohol ethoxylates having a hydrophobic portion having from 10 to 16 carbon atoms, from 12 to 15 carbon atoms, or even from 12 to 14 carbon atoms with from 6 to 7 moles of ethylene oxide. It is understood that other nonionic alcohol ethoxylates with different chain lengths and distributions of either or both the hydrophobic and hydrophilic portions can be employed, depending upon the overall composition. In embodiments, the concentrated cleaning compositions comprise fatty alcohol ethoxylates having a hydrophobic portion comprising 8 to 16 carbon atoms and a hydrophilic portion comprising from 6 moles to 9 moles of ethoxylate units per mole of the fatty alcohol ethoxylate.

The concentrated cleaning compositions include from 10 wt. % to 60 wt. % nonionic surfactants based on the total weight of the concentrated cleaning compositions. In embodiments, the concentrated cleaning compositions may include from 10 wt. % to 50 wt. %, from 10 wt. % to 45 wt. %, from 10 wt. % to 20 wt. %, from 20 wt. % to 60 wt. %, from 20 wt. % to 50 wt. %, from 20 wt. % to 45 wt. %, from 45 wt. % to 60 wt. %, or even from 45 wt. % to 50 wt. % nonionic surfactants, on an active matter basis, based on the total weight of the concentrated cleaning compositions. As used herein, the term on an "active matter basis" refers to the total amount of the active compounds (not including solvents) divided by the total weight of the concentrated cleaning composition. In some instances, the nonionic surfactants or other constituents may be provided as solutions. The weight percent of the constituent, on an active matter basis, refers the percentage range of the active ingredient in the concentrated cleaning composition and does not include the solvent or diluents present in a solution containing the active ingredient.

In embodiments, the concentrated cleaning composition may optionally include one or more secondary nonionic surfactants in addition to the fatty alcohol ethoxylates. The secondary nonionic surfactants may include other classes of nonionic surfactants, such as alkyl polyglucosides, which can be included in the concentrated cleaning compositions. These secondary nonionic surfactants can offer a good safety and sustainability/environmental profile. These secondary nonionic surfactants are commercially available from BASF and others. In embodiments, the concentrated cleaning compositions may comprise alkyl polyglucosides as a secondary nonionic surfactant. The concentrated cleaning compositions disclosed herein may have a concentration of secondary nonionic surfactants that is less than a concentration of the fatty alcohol ethoxylates. In embodiments, the concentrated cleaning compositions disclosed herein may have a concentration of secondary nonionic surfactants that is less than or equal to 10 wt. % based on the total weight of the concentrated cleaning compositions.

In embodiments, fatty acid methyl ester ethoxylates and ethoxylates of vegetable oils that include complex mixtures of both hydrophilic and hydrophobic substances can be useful in some formulations of the concentrated cleaning compositions. The later, when castor oil is used and ethoxylated, may contain glycerol polyethylene glycol ricinoleate, fatty acid esters of polyethylene glycol and some unchanged vegetable oil, as well as polyethylene glycols and glycerol ethoxylates.

Anionic Surfactants

The concentrated cleaning compositions of the present disclosure can include an alkyl methyl ester sulfonate (MES), which has a low critical micellular concentration and provides excellent detergency that is less sensitive to water hardness than many other surfactants. The alkyl methyl ester sulfonate does not involve sulfonation of ethoxylated materials and, therefore, does not introduce any additional 1,4-dioxane into the final product. In laundry liquids, most of the 1,4-dioxane is introduced from the sulfation of ethoxylated alcohols, and this is eliminated or very reduced in the cleaning compositions of the current disclosure. In embodiments, the concentrated cleaning compositions may be substantially free of 1,4-dioxane, such as containing less than 1.0 ppm, less than 0.1 ppm, or even less than 0.01 ppm 1,4-dioxane by weight based on the total weight of the concentrated cleaning compositions.

The MES may be manufactured using a stripping technique to remove residual methanol, a byproduct, so as to limit the methanol in the surfactant and to avoid a toxicity concern with methanol in the final product. In embodiments, the MES may be made using bio-based feedstocks, such as palm, palm kernel, coconut and other vegetable feedstocks. The MES may have a carbon chain having from 12 to 18 carbon atoms, such as from 12 to 16, from 12 to 14, from 14 to 18, from 14 to 16, or from 16 to 18 carbon atoms. In embodiments, for purposes of improved detergency, the MES may be based on a carbon chain feedstock that has 16 to 18 carbons in the carbon chain. In embodiments, the MES may include a carbon chain having from 12 to 14 carbon atoms. MES having carbon chain length of from 12 and 14 carbon atoms may also offer good detergency and may provide improved solubility in liquid formulations compared to MES having longer carbon chains. Although the liquid versions of MES having smaller carbon chains (e.g., 12-14 carbons) are most convenient to formulate and process using conventional liquid mixing equipment, the use of solid and/or pastes of MES having longer carbon chains (e.g., 16-18 carbons) can be provide the ability to further concentrate the cleaning compositions, compared to conventionally used alcohol ethoxysulfates, which are not available in the form of pastes and usually can only be concentrated to 70% in water. The MES surfactant under equivalent wash concentrations has been found to provide improved performance with respect to detergency in hard water compared to commonly used alkylbenzene sulfonates (e.g., dodecylbenzene sulfonate). The MES surfactant also biodegrades in the environment more rapidly and has lower acute oral toxicity. Finally, in concentrated liquid formats, the MES surfactants are less likely to denature enzymes compared to the alkylbenzene sulfonates.

The use of the anionic surfactant—alkyl methyl ester sulfonate (MES)—provides improved performance over commonly used dodecyl benzene sulfonates and natural sodium lauryl sulfate in terms of performance across water hardness levels, and it has advantages over commonly used alcohol ethoxysulfates (e.g., SLES or AES) due to the absence of 1,4-dioxane in the MES. In the manufacture of SLES, 1,4-dioxane formation is most significant in the acid-ether reaction stage pre-neutralization. Due to introduction of water during neutralization, the 1,4-dioxane is difficult to remove post-neutralization. Even with state of the art vacuum stripping technology, the concentration of 1,4-dioxane can only be reduced to some extent and cannot be totally removed. The MES also has a comparatively low acute oral toxicity rating, a low skin irritation rating, a superior biodegradation profile, and is practically non-toxic to aquatic organisms. Additionally, the MES can be used as a paste (semi-solid) or solid in the preparation of the liquid, unlike alcohol ethoxysulfates, which enables further concentration of the cleaning constituents in the concentrated cleaning compositions when using pastes of MES in such formulations. The MES also has advantages over alpha olefin sulfonates (AOS) in that the latter has trace residual levels of sultones (i.e., small ring structure chemical byproducts that are skin sensitizers), formed by the sulfonation process of alpha olefins and mitigated through a lengthy hydrolysis process, and such residual sultones can become reactive with bleaching chemicals (sodium hypochlorite for laundry whitening or bleaching) used as adjuncts in the laundry washing process—such reaction products—chlorinated sultones—are very strong skin sensitizers at trace levels. For this reason, AOS chemistry has been largely avoided in commercial laundry preparations in the North American market, but not so much as in Japan where bleaches are not commonly used.

Due to the ester linkage within the MES molecule, this class of surfactants can hydrolyze when contacted with alkaline materials. The MES is added in the batching process after the other main components have been added and the pH has been adjusted to 7.0-8.0, using appropriate pH control agents and fatty acid neutralizing agents as explained in subsequent sections of the present disclosure.

These MES surfactants, in both liquid and paste/solid formats, are commercially-available from any one of Stepan Company, Global Eco Chemicals, Lion Eco Chemicals, KLK Oleo, KPL International Limited, Guangzhou Keylink Chemical Company, and others. Chemithon Corporation of Seattle, Washington, USA, is a major designer of sulphonation systems to convert fatty acid methyl esters into sodium fatty acid methyl ester sulfonates. In embodiments, the MES has a low concentration of the sulfonated fatty acid sodium salt, which is a disalt. The sulfonated fatty acid sodium salt is a byproduct formed when the methyl ester is hydrolyzed to the sodium salt, and this di-salt compound is a poorer detergent than the methyl ester sulfonate. Sulfonation processes have been improved to reduce the di-salt formation, by using an excess of methanol with the peroxide bleaching step, prior to neutralization of the fatty acid methyl ester sulfonic acid. Chemithon Corporation has developed an efficient high yielding MES process with minimal di-salt formation, which is used by several producers around the world. In embodiments, the concentrated cleaning composition may have a weight ratio of the active MES to the sulfonated fatty acid sodium salt of greater than or equal to 10:1. In embodiments, the concentration of the sulfonated fatty acid sodium salt in the MES containing raw material may be less than or equal to 10% of the concentration of the active MES in the MES containing raw material.

Another consideration in sourcing the MES is to source from a supplier that strips out residual methanol, a processing chemical used in conversion control to optimize the sulfonation process of the fatty acid methyl ester, to trace parts per million levels. In embodiments, the MES may have less than or equal to 100 ppmw methanol, such as less than 10 ppmw, or even less than 1 ppmw methanol based on the total weight of the MES. Because of lengthy bleaching that occurs during its manufacture, the MES may include bleach chemical residuals, typically peroxides and/or hypochlorite. It is an aspect of this disclosure that an appropriate amount of a suitable reducing agent may be added to the concentrated cleaning compositions to eliminate the presence of bleach chemicals, especially peroxide and hypochlorite, so as to achieve stable amylase enzyme activity levels in the final product on long term storage. In embodiments, the concentrated cleaning compositions may include a reducing agent capable of reducing bleaching chemicals, such as but not limited to peroxides and hypochlorite, as further discussed herein.

Generally speaking, shorter chain C12-C14 MES materials, such as those derived from palm kernel oil or coconut, may offer ease of processing but may exhibit reduced detergency relative to longer chain C16-C18 tallow or palm oil derived MES. However, the later are harder to dissolve due to the longer carbon chains and have reduced solubility at lower temperatures compared to the shorter chain C12-C14 MES. Cation substitution can used be used improve the solubility of the MES in making preparations of laundry liquid. For example, monoethanolamine (MEA) can be used in excess of the amounts needed to neutralize the fatty acids used in the formulation to exchange sodium ions off the MES molecule, which may aid in dissolution of the MES. This may be necessary in cases of high usage levels of MES, particularly higher usage levels of C16-C18 palm oil or tallow derived MES. In embodiments, the concentrated cleaning compositions may include MEA in an amount that is a stoichiometric excess to the amount needed to neutralize the fatty acid. The free MEA in the final product, after mixing, is reduced by the addition of an acid to adjust the pH to the 7-8 range. In embodiments, the concentrated cleaning compositions may include an amount of MES of from 5 wt. % to 50 wt. %, from 5 wt. % to 40 wt. %, from 10 wt. % to 50 wt. %, from 10 wt. % to 40 wt. %, or from 20 wt. % to 40 wt. % on an active matter basis (i.e., based on the weight of the MES without taking into account any solvent or diluent), based on the total weight of the concentrated cleaning compositions.

In embodiments, the concentrated cleaning compositions may optionally include one or more secondary anionic surfactants in addition to the MES. The other anionic surfactants may include, but are not limited to alcohol ethoxysulfates, alcohol sulfates, alpha olefin sulfonate, and others. In embodiments, the concentrated cleaning composition may include sodium lauryl sulfate, alpha olefin sulfonates, or both as optional secondary anionic surfactants. These optional secondary anionic surfactants are not to be used as the principal anionic surfactants for the following reasons, and in embodiments are eliminated or used only as secondary surfactants at minor levels. As previously discussed, alcohol ethoxysulfates introduce dioxane, alcohol sulfates have poor water hardness tolerance, and alpha olefin sulfonates have sultone residuals which can be reactive with bleaching chemicals used as an adjunct in domestic washing, resulting in strong skin-sensitizing chlorinated sultone chemicals.

The concentrated cleaning compositions disclosed herein may have a concentration of secondary anionic surfactants that is less than a concentration of the MES. In embodiments, the concentrated cleaning compositions disclosed herein may have a concentration of secondary anionic surfactants that is less than or equal to 10 wt. % or less than or equal to 5 wt. % based on the total weight of the concentrated cleaning compositions.

Fatty acid soaps are another class of anionic surfactants, which are incorporated in the present disclosure and are discussed in further detail below. In embodiments, the concentrated cleaning compositions may include one or more fatty acid soaps. The concentrated cleaning compositions may include an amount of anionic surfactants (i.e., MES, fatty acid soaps, or other anionic surfactants) sufficient to provide the desired detergency effect. In embodiments, the concentrated cleaning composition may include a total amount of anionic surfactants, including MES, fatty acid soaps, and other optional secondary anionic surfactants, of from 10 wt. % to 50 wt. % on an active matter basis, based on the total weight of the concentrated cleaning composition.

De-Foaming Agents and Surface Active Agents

The concentrated cleaning compositions of the present disclosure can include an additional surfactant that serves also as de-foamer. The additional surfactant that serves as a defoamer can be a fatty acid based soap, such as but not limited to a coconut fatty acid, palm kernel oil fatty acid, oleic fatty acid, or any other single or blend of fatty acids with carbon chains between 8-20 carbon atoms in length, that are neutralized by an alkali metal salt or organic base, or combination of bases. One such organic base is monoethanolamine. Such fatty acid based soaps can be added directly or formed in situ with fatty acids and the separate addition of a basic (alkaline) chemical (e.g., alkali metal salt, organic base, or both). For example, the use of either inorganic (e.g., hydroxides, carbonates, etc.), or organic (e.g., amines, monoalkylamines, dialkylamines, and trialkylamines with 1 to 4 carbon atoms in the alkyl radical, the corresponding mono-, di-, or trialkanolamines with 2 to 4 carbons atoms in each alkylol, cycloalkylamines, and heterocyclic amines) compounds for fatty acid neutralization and pH control may be included in the concentrated cleaning compositions. In embodiments, organic bases can include monoethanolamine, triethanolamine, monoisopropylamine, diisopropylamine, or combinations thereof. Optionally, these bases, when organic, can be prepared from either petrochemical or natural based feedstocks. In embodiments, the concentrated cleaning compositions may include organic bases prepared from sustainable plant-derived feedstocks.

In the present disclosure, the amount of fatty acid soap surfactants in the concentrated cleaning compositions, on an active matter basis, may be from 2 wt. % to 20 wt. % based on the total weight of the concentrated cleaning composition, and may make up a portion of the total anionic surfactants in the concentrated cleaning composition discussed above.

In embodiments, the fatty acid for making the de-foaming soap, and as secondary anionic surfactant to the MES, can be oleic acid. However, the oleic acid, having a single double bond and containing some polyunsaturated fatty acid, is prone to hydroperoxide formation on storage, and this process of autoxidation is accelerated by trace metals, light exposure and oxygen exposure, among other factors. Trace levels of hydroperoxides of the following carbon chains can commonly form from oleic acid—C8, C9, C10, and C11. Linoleic acid, also present in small amounts in commercial oleic acid, may form hydroperoxides on C9, C11, and C13. These trace amounts of hydroperoxides must be effectively eliminated, along with any other peroxides or oxidizing agents contributed by the bleaching of the commercial surfactants, such as MES. The traces of hydroperoxides and any other peroxides or oxidizing agents can be removed by adding an appropriate level of a reducing agent in the starting batching water when making the laundry liquid preparation and/or subsequently after the main surfactant components are added to the batch, but before enzymes are added. The amount of the reducing agent may be determined empirically from enzyme activity studies on the final formulation as a function of time and temperature. Typically, the cleaning compositions may include from 0.01 wt. % to 0.50 wt. % by weight reducing agents based on the total weight of the cleaning compositions. Additionally, the use of oleic acid with a lower linoleic acid percentage, (e.g. EMERSOL® 233 LL oleic acid from Emery Chemicals), such as a concentration of linoleic acid of less than 5 wt. %, can improve the oxidative stability and color stability of the formulation, and reduce formation of hydroperoxides. This elimination of oxidizing chemicals may aid in maintaining the stability of amylase enzymes.

In embodiments, the concentrated cleaning compositions may include an optional secondary defoamer. Optional secondary defoamers may include, but are not limited to silicon-based defoamers, polymerized siloxane type defoamers, polyols, or other commercially available defoamers. In embodiments, the concentration of secondary defoamers may be less than the concentration of the fatty acid soaps in the concentrated cleaning compositions. In embodiments, the foam reduction in the concentrated cleaning compositions can be achieved through the use of very small amounts (e.g. <1.0 wt. %) of non-soap defoaming chemicals, such as but not limited to polymerized siloxane types, including polydimethylsiloxane and other polymerized siloxanes, polyols, and other conventional de-foaming chemicals. Examples include XIAMETER™ defoamers or other foam control agents available from Dow Chemical.

Enzymes

The concentrated cleaning compositions of the present disclosure incorporate one or a plurality of enzymes or enzyme blends and one or a plurality of enzyme stabilizers. The enzymes may include any one of a number of hydrolyses, such as but not limited to proteases, amylases, mannanases, pectate lyase, lipases, or combinations of these. The enzymes may further include one or more cellulases. These enzyme preparations are commercially available from Novozymes, Dupont, and BASF, among others.

In the present disclosure, the amount of each enzyme, used as commercial stabilized formulations as received, or individual enzymes in stabilized liquid compositions as received, can be from 0.1 wt. % to 3.0 wt. % based on the total weight of the concentrated cleaning composition. The weight percentages of the enzymes are based on the total weight of the stabilized enzyme formulation, as received, and includes all the constituents of the enzyme formulation.

Suitable enzyme stabilizers, which may be included in the commercial enzymes or added in separately during final product batching of the concentrated cleaning compositions, may include reducing agents such as sulfites, or sulfite forming chemicals for amylase stability, polyols such as propylene glycol or other glycols and tripeptide inhibitors for protease enzyme protection, small carboxylates (e.g., calcium formate or sodium formate), and traditional boron containing molecules. Calcium chloride or calcium chloride dihydrate can be used to increase $Ca^{++}$ ions in the aqueous phase and offer additional enzyme stabilization. As previously discussed, a suitable reducing agent may be included to eliminate traces of peroxides and hydroperoxides contributed by the base chemistry of the formulation, in order to ensure amylase enzyme activity on long-term storage.

In embodiments, the concentrated cleaning compositions do not include any bleaching agents or bleach activators due to the presence of the enzymes and enzyme stabilizers in the concentrated cleaning compositions. As previously discussed, bleaching agents can reduce the activity of one or more of the enzymes in the concentrated cleaning compositions and are, therefore, excluded from the concentrated cleaning compositions of the present disclosure. The only permitted exception to this would be an encapsulated bleaching agent that does not allow bleaching chemistry into the aqueous phase of the detergent composition containing the enzymes.

Solvent System: Solvents and Hydrotropes

A solvent system may be included to maintain appropriate viscosity, product solubility, product clarity, and compatibility with the film materials. In embodiments, the concentrated cleaning compositions may include one or more organic solvents, water, or both. Organic solvents may include but are not limited to propylene glycol, dipropylene glycol, glycerine, and other polyol chemicals, or some combination of these. In embodiments, the solvents in the concentrated cleaning compositions can be derived from plant (bio) based sources. Bio-based propylene glycol is commercially available from ADM Corporation. In embodiments, the concentrated cleaning composition may include an amount of organic solvents of from 10 wt. % to 30 wt. % based on the total weight of the concentrated cleaning composition.

In embodiments, the concentrated cleaning composition includes water. Water is an important part of the solvent system as well, and water can be incorporated directly into the formulation or indirectly by way of the aqueous content of the raw materials (e.g., solutions of MES surfactant, or water content in MES paste). In embodiments, the concentrated cleaning compositions can include a total amount of water from all sources combined in a range of from 5 wt. % to 20 wt. % based on the total weight of the concentrated cleaning composition.

In embodiments, the concentrated cleaning compositions may include one or a plurality of hydrotropes or coupling agents/solubilizers to assist in making the surfactants and solvents more soluble in the sparingly aqueous concentrate. The hydrotropes may be synthetic or naturally-derived hydrotropes. Some examples or hydrotropes include, but are not limited to, a natural based sodium n-octyl sulfate or sodium octane sulfonate, sodium xylene sulfonate, sodium cumene sulfonate, or combinations of these. Polyol organic solvents previously discussed may be considered hydrotropes. In embodiments, the concentrated cleaning composition may include one or a plurality of hydrotropes that is not a polyol organic solvent. In embodiments, the concentrated cleaning compositions may include an amount of hydrotropes other than polyol organic solvents of from greater than or equal to 0 (zero) wt. % to 10 wt. %, such as from greater than 0 (zero) wt. % to 10 wt. % or from 0.1 wt. % to 10 wt. % based on the total weight of the concentrated cleaning composition.

In some embodiments, the concentrated cleaning compositions disclosed herein may be formulated such that the total organic carbon is greater than or equal to 90% bio-based, or even greater than or equal to 95% bio-based, as determined according to ASTM D6866 for determining the total organic carbon based on the concentration of carbon 14 in the composition. Bio-based constituents refer to constituents that are derived from renewable carbon resources, such as plant matter, animal matter, or other renewable carbon resources. When using commercially-available naturally-derived ethoxylated fatty alcohols, renewable carbon index levels of the concentrated cleaning compositions can reach or exceed 90% or even 95%, as determined from ASTM D6866, providing sustainability, biodegradability and safety profiles that are better than conventional products.

Additional Performance and/or Aesthetic Agents

Additionally, the concentrated cleaning compositions may include one or more components to enhance performance and/or aesthetics while maintaining a high renewable carbon index for the entire formulation, especially when formulating with plant-derived chemicals. These additional additives can include, but are not limited to: (1) one or a plurality of detersive polymers, such as polyitaconate, polyaspartate, carboxymethylcellulose, and others, either of natural or synthetic origin; (2) one or a plurality of chelants, such as MGDA or GLDA, EDTA, EDDS, IDS, or others; (3) fragrance or fragrance mixture; (4) one or a plurality of disinfectant and/or active ingredients having germicidal activity; (5) a preservative; (6) pH control agent or agents, such as citric acid, or sodium citrate; (7) a colorant or colorant(s); (8) thickening agent(s), either natural (e.g., xanthan gum) or synthetic (associative polymeric thickeners); (9) other classes of surfactants; (10) optical brighteners; (11) anti-dye transfer agents; (12) color protection agents; (13) anti-redeposition agent; (14) other fabric care detersive agents; (15) fabric softening/conditioning agents; (16) opacifying agents; or (17) combinations of these. In embodiments, the concentrated cleaning composition may include one or more detersive adjuncts selected from the group consisting of chelants, detersive polymers, suspended detersive agents, fabric conditioning agents, additional surfactants, and combinations of these. In embodiments, the concentrated cleaning composition may include one or more aesthetic components selected from the group consisting of fragrances, encapsulated fragrances, opacifying agents, optical brighteners, colorants, and combinations of these.

Chelants and Detersive Polymers

In embodiments, the concentrated cleaning compositions of the present disclosure may include one or a plurality of chelants, one or a plurality of detersive polymers, or both.

Strong chelants have high stability constant logarithms for both calcium and heavier metal ions (e.g., pK (Ca) greater than 5, where pK (Ca) is the stability constant logarithm for calcium) at the relevant wash pH conditions. The stability constant logarithm, pK (M) is a measure of the strength of the complex between the metal ion (M) and the chelant at the relevant wash pH conditions. Chelation with the strong metal ion chelant provides water soluble chelation. In embodiments, the strong chelant may include N,N-bis(carboxymethyl) glutamic acid (GLDA). Other strong chelants that may be incorporated may include, but are not limited to, methylglycine diacetic acid (MGDA), ethylene diamine tetraacetic acid (EDTA), iminodisuccinic acid (IDS), other strong chelants, or combinations of these. Most recently, plant derived versions of strong chelants—MDGA and GLDA—have become commercially available and can used in the cleaning compositions of the current disclosure without materially impacting the relatively high renewable carbon index achieved by the use of the principally fatty acid based formulation. In embodiments, the concentrated cleaning compositions may include from greater than or equal to 0 (zero) wt. % to 10 wt. % strong chelants based on the total weight of the concentrated cleaning composition, such as from greater than 0 (zero) wt. % to 5 wt. %, from 0.1 wt. % to 10 wt. %, or even 0.1 wt. % to 5 wt. % strong chelants based on the total weight of the concentrated cleaning composition. In embodiments, the concentrated cleaning composition does not include a strong chelant.

Optionally, in embodiments, the concentrated cleaning composition may include one or more weak chelants. Weak chelants may include, but are not limited to, sodium citrate, sodium citrate dihydrate, or combinations thereof. In some embodiments, the weak chelant may be a citrate formed in situ during manufacturing of the composition through the reaction of citric acid and an alkaline material in the concentrated cleaning composition or some component of the concentrated cleaning composition. In some embodiments, other weak chelants, such as ethylenediamine-N,N-disuccinic acid (EDDS) for example, may be incorporated into the concentrated cleaning compositions. In embodiments, the concentrated cleaning compositions may include from greater than or equal to 0 (zero) wt. % to 10 wt. % weak chelants based on the total weight of the concentrated cleaning composition, such as from greater than 0 (zero) wt. % to 5 wt. %, from 0.1 wt. % to 10 wt. %, or even from 0.1 wt. % to 5 wt. % weak chelants based on the total weight of the concentrated cleaning composition. In embodiments, the concentrated cleaning composition does not include a weak chelant.

In embodiments, optionally, performance enhancements with naturally based detersive polymers, and other naturally based detersive additives can be incorporated while maintaining the high renewable carbon index and favorable toxicity profile. These naturally based detersive polymers can include but are not limited to sodium polyitaconate, polyaspartate, copolymers of naturally derived monomers and combinations of these. In embodiments, the concentrated cleaning compositions may include from greater than or equal to 0 (zero) wt. % to 10 wt. % detersive polymers based on the total weight of the concentrated cleaning composition, such as from greater than 0 (zero) wt. % to 5 wt. %, from 0.1 wt. % to 10 wt. %, or even from 0.1 wt. % to 5 wt. % detersive polymers based on the total weight of the concentrated cleaning composition. In embodiments, the concentrated cleaning composition does not include detersive polymers.

Other Amphoteric, Ampholytic, or Cationic Surfactants

In embodiments, other surfactants that could be incorporated, on minor basis, include amphoteric and/or ampholytic surfactants. Such examples can include but are not limited to surfactant classes such as betaines, hydroxyl sultaine, amphoacetates, amphopropionates, aminopropionates (e.g., ampholytic), amine oxides (e.g., ampholytic), ethoxylated amine based chemistry (e.g., polyoxyethylene isodecyloxypropyl-amine and bis-(2-hydroxyethyl) isodecyloxypropylamine) and quaternized amine chemistry. The concentrated cleaning composition may include concentrations of amphoteric surfactants, ampholytic surfactants, or both that is less than the total concentration of anionic surfactants (e.g., MES, fatty acid soaps, etc.) in the concentrated cleaning compositions. In embodiments, the concentrated cleaning composition does not include amphoteric surfactants, ampholytic surfactants, or both. When considering cationic surfactants, their incompatibility with anionic surfactants may be a limitation due to cation-anion interactions. In embodiments, the concentrated cleaning composition does not include a cationic surfactant.

Alkalinity and pH Control Agents

The concentrated cleaning compositions of the present disclosure may additionally include an alkaline compounds or other pH control agent. Alkaline compounds may provide cleaning and pH control in the alkaline region for effective cleaning.

In embodiments, ammonia may be used as the pH control agent in the concentrated cleaning composition. In other embodiments, any number of pH control agents can be used. For example, the use of either inorganic (e.g., hydroxides, carbonates, etc.), or organic (e.g., amines, monoalkylamines, dialkylamines, and trialkylamines with 1 to 4 carbon atoms in the alkyl radical, the corresponding mono-, di-, or trialkanolamines with 2 to 4 carbons atoms in each alkylol, cycloalkylamines, and heterocyclic amines) compounds for pH control may be included in the concentrated cleaning compositions. In embodiments, the concentrated cleaning composition may not include a pH control agent, an alkaline compound, or both.

Preservation

The concentrated cleaning compositions of the present disclosure may include one or more preservatives. Any one of many preservatives, approved for use in household cleaning products may be considered. In particular, preservatives suitable for inclusion in the concentrated cleaning compositions of the present disclosure may include, but are not limited to, methylchloroisothiazolinone, methylisothiazolinone, benzisothiazolinone, benzalkonium chloride, benzethonium chloride, benzoic acid or sodium benzoate, benzyl alcohol, choroxylenol, salicylic acid or its metal salt form, sorbic acid or its metal salt form, or some combination of these. It is understood that preservatives other than those listed may also be suitable for use in the concentrated cleaning compositions of the present disclosure. In embodiments, the concentrated cleaning compositions may not include preservatives.

Suspended Chemicals in the Liquid Concentrate

Optionally, given that the concentrated liquid of the concentrated cleaning composition has a low percentage of water, (i.e., only 1-15% free water by weight), embodiments of the present disclosure may include using, within the concentrated liquid, solid suspended particles with detersive properties, that would be fully dissolved upon dilution. Thus, in embodiments, the concentrated cleaning compositions may include a plurality of solid suspended particles comprising one or more of the active ingredients (e.g., detersive polymers, surfactants, chelants, etc.) of the concentrated cleaning compositions. Additionally, structuring agents (e.g., cross-linked polyacrylates, or naturally derived structuring agent chemicals) that provide thixotropy, psuedoplasticity or other viscosity building effects in the concentrated liquid, which can aid in suspension of such suspended materials, may be included in the concentrated cleaning compositions of the present disclosure. In embodiments, the concentrated cleaning composition does not include solid suspended particles, but rather all the constituents of the cleaning composition may be in liquid forms.

Encasing Film

The liquid laundry unit dose of the present disclosure may include the concentrated cleaning compositions contained within a packet or pouch formed from a water-soluble film, such as but not limited to a polyvinyl alcohol (PVA) film. The PVA films may have suitable mechanical and chemical properties, as defined by the degree of hydrolysis of the polyvinyl acetate to alcohol and the degree of polymerization, the solvents, plasticizers used and other processing and formulation aspects. The PVA film can be able to form a packet or pouch of sufficient mechanical strength to meet consumer regulations, and can provide for a product that has suitable stability on storage under a variety of temperature and humidity conditions as experienced in commerce and consumer households. PVA films produced by Aicello or Kurray (Monosol division) may be used, but there are many other commercial suppliers.

In some embodiments, films may be formulated with combinations of one or more of polyvinyl alcohol and polyvinyl pyrrolidone, ethoxylated alkyphenol, polyacrylic acid and polyhydric alcohol (see U.S. Pat. Nos. 4,481,326, 4,544,693, 4,692,494, 4,765,916, which are incorporated by reference herein in their entirety); water soluble laminate films that comprise at least one methylcellulose layer of hydroxybutyl methylcellulose blended with hydroxypropyl methylcellulose and polyvinyl alcohol as a cross linking agent (see U.S. Pat. No. 4,801,636, which is incorporated by reference herein in its entirety); blends of polyvinyl alcohol and alkyl cellulose with a metalloid oxide to inhibit dissolution of the film encasing a strongly alkaline liquid but allow dissolution in a less alkaline solution (U.S. Pat. No. 4,972,017, which is incorporated by reference herein in its entirety); or films with polyvinyl alcohol and a water insoluble cellulose material (U.S. Pat. No. 5,272,191, which is incorporated by reference herein in its entirety).

The unit dose packet may be a single compartment unit dose packet comprising a single compartment or a multiple-compartment unit dose packet having a plurality of compartments separated from each other. In embodiments, the unit dose packet may be a multiple-compartment unit dose packet comprising the plurality of compartments, and at least one of the plurality of compartments may comprise a powder composition. The powder composition may include one or more constituents of the concentrated cleaning composition in solid form. The other compartments may include the other constituents of the concentrated cleaning composition. In embodiments, the powder composition may be a separate solid powder cleaning composition, and the liquid compartments may include the concentrated cleaning composition disclosed herein. Other configurations of a multiple-compartment unit dose packet comprising the concentrated cleaning compositions disclosed herein are contemplated.

The unit dose of concentrated cleaning composition may be prepared by preparing the concentrated cleaning composition and sealing a portion of the concentrated cleaning composition within a pouch or packet formed by a water soluble film, such as PVA film or other water soluble polymer film. Preparing the concentrated cleaning composition may include combining one or more of the constituents of the concentrated cleaning composition and mixing the combined constituents to produce a homogeneous concentrated cleaning composition. The constituents of the concentrated cleaning composition may be any of the constituents previously described in this disclosure, or combinations thereof.

EXAMPLES

The following examples illustrate one or more additional features of the present disclosure described previously. It should be understood that these examples are not intended to limit the scope of the disclosure or the appended claims in any manner. Nor are the following examples intended to represent the entire range of possible formulations of the compositions of the present disclosure. There are numerous other contemplated examples that employ alternative materials and suppliers having the functional chemical properties of the materials that are described in the present disclosure.

Example 1: Manufacturing of Concentrated Cleaning Compositions for Laundry Applications In Example 1, the manufacturing process and exemplary materials for preparing the liquid concentrated cleaning compositions for laundry applications are discussed. The manufacturing process proceeds according to the order of addition in Table 1. The concentrated cleaning compositions are prepared by combining the constituents of the concentrated cleaning composition in the order of addition listed in Table 1 and then mixing the combined constituents to produce a homogeneous concentrated cleaning composition. Any commercially-available mixing or compounding equipment can be used to prepare the concentrated cleaning compositions. Once prepared, the concentrated cleaning compositions are then encapsulated in a packet or pouch comprising a water-soluble film, such as a PVA film.

In the manufacturing process, there are a few steps that can be taken to ensure chemical and physical stability of the various constituents of the concentrated cleaning compositions. First, the water is purified to a high standard for enzyme stability, and additional reducing agents, such as but not limited to sodium bisulfite or metabisulfite or functionally equivalent reducing agents, are added either in the purified water or immediately before enzyme addition.

The reaction of the fatty acid and organic base to make the de-foaming fatty acid soap is exothermic. The heat generated by the formation of the de-foaming fatty acid soap increases the intermediate batch temperature at this stage, which can aid in the dissolution of the fatty acid methyl ester sulfonate (MES) in the concentrated cleaning composition. Warmer temperatures may or may not be required depending upon the form, chemical chain length, and quantity of the MES used.

Additionally, the MES can be susceptible to hydrolysis and, depending upon the form, chain length, and concentration of the MES, additional solubilizing agents can be added to improve solubility. If concentrated pastes of MES are used, the solubility of the MES can be enhanced by ion exchange of monoethanolamine (MEA) to replace sodium ion on the MES molecule in situ; in this case the use of MEA will be in a stoichiometric excess to the amount needed to neutralize the fatty acid. The pH would be adjusted down to near 8 with a suitable acid such as sulfuric acid.

The pH should be in the 5-8 range when adding MES and, in particular, between 7-8. This pH of 7-8 should be maintained throughout the remainder of the batching process so that the MES does not encounter acidic or alkaline conditions.

The enzymes are added at a batch temperature less than 30° C., such as less than 25° C., and at a pH between 7-8. The following Table 1 provides a listing of the constituents of the concentrated cleaning composition of Example 1 in the order of addition along with relevant batch conditions for certain addition steps.

TABLE 1

| | Example of Bio-based liquid laundry concentrated cleaning compositions without aesthetic agents. Liquid phase preparation example - order of addition shown | | | |
|---|---|---|---|---|
| Supplier | Constituent | wt. % typical range | Batch temperature ° C. | pH |
| | Purified Water adjusted with reducing agent - 5000 ppm sodium metabisulfite - see note 1 | 0-10 | ambient | |
| ADM and others | Propylene Glycol, USP, Excipient Grade/EP, bio-based, (EVO-100 ™) - ADM | 10-20 | | |
| Tritex; Croda, Rhodia | Alcohol ethoxylate - TRISURF LA-7 90% VG grade; - see note 2 | 10-50 | | |
| Emery Chemicals | Oleic acid - EMERSOL ® 221 - see note 3 | 5-20 | | |
| Brenntag | Monoethanolamine - see note 4 | 1-5 | Exotherm due to neutralization | |
| | Desired pH 7-8 - pH adjustment may be recommended; citric acid or MEA | | 30-35 C. | 7.0-8.0 |
| Stepan; Lion Corp; KLK Oleo; Guangzhou Keylink Chemical Company: | Sodium fatty acid methyl ester sulfonate solution 38-40% - see note 5 | 10-40 | Cooling recommended | |
| | Calcium Chloride Dihydrate | 0.01 | | |
| | Temperature/pH | | ambient | 7.0-8.0 |
| Novozymes | Protease/amylase with stabilizers - MEDLEY ® Core 200 L | 0.1-3.0 | | |
| Novozymes | Lipase blend with stabilizers - LIPEX ® EVITY ® 100 L | 0.1-3.0 | | |
| Novozymes | Mannanase with stabilizers - MANNAWAY ® 4.0 L | 0.1-3.0 | | |
| Novozymes | Pectyl lyase with stabilizers - XPECT ® 1000 L | 0.1-3.0 | | |
| Novozymes | Cellulase with stabilizers - CAREZYME ® Premium 4500 L | 0.1-3.0 | | |
| Novozymes | Cellulase with stabilizers - CELLUCLEAN ® 5000 L | 0.1-3.0 | | 7.0-8.0 |

Note 1

Optionally, the reducing agent or agents (eg. sodium sulfite, sodium metabisulfite, etc.) can be added after the surfactants but before the enzymes are added. Sufficient reducing agents is added to eliminate free peroxides, chlorine bleach residuals and hydroperoxides.

Note 2

Optionally, other fully naturally derived alcohol ethoxylates such as ECO BRIJ ™ L7 surfactants from Croda Corp. or "RHODASURF ® 6 NAT" surfactant from Solvay (formerly Rhodia Corp.) can be included while still maintaining a very high renewable carbon index for the entire formulation.

Note 3

Any one or more of C8-C20 fatty acids can be used, saturated, or unsaturated, odd or even number carbon, including, but not limited to coconut (blend), caprylic, capric, lauric, myristic, palmitic, stearic, oleic acid.

Note 4

Optionally, other organic amines bases, as previously mentioned in this disclosure, and/or inorganic bases can be used as the neutralizing agent.

Note 5

Optionally, ALPHA-STEP ® PC 48 anionic surfactant from Stepan Corporation or MIZULAN ™ L128-40 MES (C12-18 chain length) and concentrated MES version having greater than 40% active content, such as MIZULAN ™ FL-80 MES, from Global Eco Chemicals can be used, as well as other powder grades of MIZULAN ™ MES for further concentration. Other solid anionic surfactants can include but are not limited to PALMFONATE ™ MES from KLK Oleo or KEYLINK ™ NS-8 powder or NS-8 flake from Guangzhou Keylink Chemical Company. Most commercial products have some sulfonated fatty acid sodium salt as a byproduct along with the main constituent - fatty acid methyl ester sulfonate.

The concentrated cleaning compositions of Example 1 are encapsulated in a PVA film to form unit dose pouches having from 15-30 grams of the concentrated cleaning composition. The concentrated cleaning compositions are contained in a single compartment or in a series of jointed compartments. The PVA film used is Aicello GSBTX 75.

Examples 2-8: Concentrated Cleaning Compositions

For Examples 2-8, several formulations of the concentrated cleaning compositions disclosed herein were manufactured and encapsulated in PVA film to produce unit dose pouches. The compositions for Examples 2-8 are provided below in Table 2. The concentrated cleaning compositions of Examples 2-8 were prepared according to the methods described in Example 1 and the constituents were added in the order listed in Table 2.

TABLE 2

| Chemical | Supplier/Trade name | Ex. 2 | Ex 3 | Ex 4 | Ex 5 | Ex 6 | Ex 7 | Ex 8 |
|---|---|---|---|---|---|---|---|---|
| Purified water | | 1 | 1 | 1 | 1 | 5.97 | 5.97 | 5.15 |
| Propylene glycol | ADM, Propylene glycol USP, Excipient Grade/ EP (EVO-100) | 15 | 15 | 15 | 15 | 15 | 15 | 15 |
| Tetrasodium Glutamate Diacetate | Nouryon - Dissolvine GL-47-S | — | — | — | — | — | — | 2.0 |
| Alcohol ethoxylate | Tritex - TRISURF ™ LA-7 90% (VG) | 55.97 | — | 55.97 | — | — | — | — |
| Alcohol ethoxylate | Solvay - RHODASURF ® 6 NAT | — | 55.97 | — | 55.97 | 47 | 45 | 44 |
| Oleic acid | Emery - EMERSOL ® 221 | 11.0 | 11.0 | — | — | — | — | — |
| Oleic acid | Emery EMERSOL ® 233LL | — | — | 11.0 | 11.0 | 11.0 | 11.0 | 11.0 |
| Monoethanolamine | Dow Chemical | 1.93 | 1.93 | 1.93 | 1.93 | 1.93 | 1.93 | 1.75 |
| Sodium metabisulfite | | 0.04 | 0.04 | 0.04 | 0.04 | 0.04 | 0.04 | 0.04 |
| Sodium fatty acid methyl ester sulfonate 40% solution; C12-18 | Stepan - ALPHA-STEP ® PC48 | 13 | 13 | 13 | 13 | 13 | 13 | 13 |
| Sodium fatty acid methyl ester sulfonate solids (approx. 80% active C16-18 MES) | Global Eco Chemicals - Formerly Lion Eco Chemicals - MIZULAN ™ P-82 LC (MB) | — | — | — | — | 4 | 6 | 6 |
| Calcium chloride dihydrate | | 0.01 | 0.01 | 0.01 | 0.01 | 0.01 | 0.01 | 0.01 |
| Sodium formate | | 0.1 | 0.1 | 0.1 | 0.1 | 0.1 | 0.1 | 0.1 |
| Protease amylase blend | Novozymes - MEDLEY ® Core 200 L | 0.8 | 0.8 | — | 0.8 | 0.8 | 0.8 | 0.8 |
| Amylase blend | Novozymes - STAINZYME ® Plus 12 L | 0.25 | 0.25 | — | 0.25 | — | — | — |
| Amylase blend | Novozymes - AMPLIFY ® Prime 100 L | — | — | — | — | 0.25 | 0.25 | 0.25 |
| Lipase blend | Novozymes - LIPEX ® EVITY ® 100 L | 0.3 | 0.3 | — | 0.3 | — | — | — |
| Lipase blend | Novozymes - LIPEX ® EVITY ® 200 L | — | — | — | — | 0.3 | 0.3 | 0.3 |

TABLE 2-continued

| Chemical | Supplier/Trade name | Ex. 2 | Ex 3 | Ex 4 | Ex 5 | Ex 6 | Ex 7 | Ex 8 |
|---|---|---|---|---|---|---|---|---|
| Mannanase blend | Novozymes - MANNAWAY ® 4.0 L | 0.3 | 0.3 | 0.3 | 0.3 | — | — | — |
| Mannanase blend | Novozymes - MANNAWAY ® 200 L | — | — | — | — | 0.3 | 0.3 | 0.3 |
| Pecyl lyase blend | Novozymes - XPECT ® 1000 L | 0.1 | 0.1 | 0.1 | 0.1 | 0.1 | 0.1 | 0.1 |
| Cellulase blend | Novozymes - CAREZYME ® 4500 L | 0.1 | 0.1 | 0.1 | 0.1 | 0.1 | 0.1 | 0.1 |
| Cellulase blend | Novozymes - CELLUCLEAN ® 5000 L | 0.1 | 0.1 | 0.1 | 0.1 | 0.1 | 0.1 | 0.1 |
| Total | | 100 | 100 | 100 | 100 | 100 | 100 | 100 |

The concentrated cleaning compositions of Examples 2-8 were all successfully packaged into unit dose laundry packets, using Aicello PVA film, grade GSBTX75, with denatonium benzoate aversive agent. The unit dose laundry packets were tested for compression strength and dissolvability according to standard ASTM test methods. The unit dose laundry packets of Examples 2-8 successfully passed the ASTM compression strength and dissolvability standards for unit dose laundry product. The unit dose laundry packets comprising the concentrated cleaning compositions of Examples 2-8 also achieved acceptable results for enzyme stability and physical stability testing.

MIZULAN™ P82 MES is a solid MES product with up to 15% added zeolite for improved flow properties and safer factory handling due to the suppression of dust combustibility factors. Higher chain length MES, primarily C16-18 fraction, can be obtained from many global suppliers, and can be sourced in either solid granule, flake or paste formats, and may or may not contain added zeolite.

What is claimed is:

1. An article comprising a unit dose packet of a concentrated cleaning composition for cleaning laundry, wherein the concentrated cleaning composition consists of, based on a total weight of the concentrated cleaning composition:

from 10 wt. % to 60 wt. % of one or a plurality of nonionic surfactants;

from 2 wt. % to 20 wt. % of one or a plurality of fatty acid soaps;

from 0.1 wt. % to 3.0 wt. % of one or a plurality of enzymes;

a solvent system;

from 5 wt. % to 50 wt. % of one or a plurality of fatty acid alkyl ester sulfonates, wherein the fatty acid alkyl ester sulfonates consist of fatty acid methyl ester sulfonates according to formula (I):

$$R—CH(SO_3M)—CO—OCH_3 \quad (I)$$

wherein R is an alkyl group and M is a cation;

from 0 wt. % to 10 wt. % of one or a plurality of chelants;

from 0 wt. % to 10 wt. % of one or a plurality of detersive polymers;

from 10 wt. % to 30 wt. % organic solvents; and at least one additive selected from the group consisting of an enzyme stabilizer, a suspended detersive agent, a fabric conditioning agent, an additional surfactant, a fragrance, an encapsulated fragrances, an opacifying agent, a colorant, an optical brightener, a pH control agent, a disinfecting agent, a germicidal agent, an anti-redeposition agent, an optical brightener, an anti-dye transfer agent, a color protection agent, a free residual monoethanolamine, and combinations thereof; and wherein the concentrated cleaning composition is compatible with polyvinyl alcohol film, wherein the unit dose packet comprises single chamber, a dual chamber, or multi-chamber unit dose packet, and at least one compartment of the unit dose packet comprises a total weight of the concentrated cleaning composition of from 15 grams to 30 grams.

2. The article of claim 1, wherein the one or a plurality of nonionic surfactants comprise fatty alcohol ethoxylates.

3. The article of claim 2, wherein the fatty alcohol ethoxylates comprise a hydrophobic portion comprising 8 to 16 carbon atoms and a hydrophilic portion comprising from 3 to 12 moles of ethoxylate units per mole of the fatty alcohol ethoxylate.

4. The article of claim 2, wherein the concentrated cleaning composition comprises one or more secondary nonionic surfactants in addition to the fatty alcohol ethoxylates.

5. The article of claim 4, wherein the secondary nonionic surfactant comprises alkyl polyglucosides.

6. The article of claim 1, wherein the one or a plurality of enzymes are selected from the group consisting of proteases, amylases, lipase, mannanase, pectate lyase, cellulases, and combinations thereof, wherein each of the plurality of enzymes are stabilized.

7. The article of claim 1, wherein the one or a plurality of nonionic surfactants, the one or a plurality of fatty acid methyl ester sulfonates, the one or a plurality of fatty acid soaps, and solvents of the solvent system are all derived entirely from plant materials.

8. The article of claim 1, wherein a concentration of 1,4-dioxane in the concentrated cleaning composition is less than 1.0 ppm based on the total weight of the concentrated cleaning composition.

9. The article of claim 1, wherein the unit dose packet is a multi-chamber unit dose packet comprising a plurality of chambers, wherein at least one of the plurality of chambers comprises a powder composition.

10. The article of claim 1, wherein the at least one additive comprises the free residual monoethanolamine, wherein the free residual monoethanolamine increase solubility of the fatty acid methyl ester sulfonate during preparation of the article.

11. The article of claim 1, wherein the solvent system comprises of from 5 wt. % to 20 wt. % water, based on the total weight of the concentrated cleaning composition.

12. The article of claim 1, wherein the concentrated cleaning composition comprises the enzyme stabilizer selected from the group consisting of tripeptide inhibitors, sulfites, sulfite precursors, short chain carboxylates, polyols, boron containing molecules, and combinations thereof.

13. A method for producing a unit dose packet, the method comprising:

preparing a concentrated cleaning composition consisting of, based on a total weight of the concentrated cleaning composition:

from 10 wt. % to 60 wt. % of one or a plurality of nonionic surfactants;

from 2 wt. % to 20 wt. % of one or a plurality of fatty acid soaps;

from 0.1 wt. % to 3.0 wt. % of one or a plurality of enzymes;

a solvent system;

from 5 wt. % to 50 wt. % of one or a plurality of fatty acid alkyl ester sulfonates, wherein the fatty acid alkyl ester sulfonates consist of fatty acid methyl ester sulfonates according to formula (I):

$$R—CH(SO_3M)—CO—OCH_3 \quad (I)$$

wherein R is an alkyl group and M is a cation;

from 0 wt. % to 10 wt. % of one or a plurality of chelants;

from 0 wt. % to 10 wt. % of one or a plurality of detersive polymers;

from 10 wt. % to 30 wt. % organic solvents; and at least one additive selected from the group consisting of an enzyme stabilizer, a suspended detersive agent, a fabric conditioning agent, an additional surfactant, a fragrance, an encapsulated fragrances, an opacifying agent, a colorant, an optical brightener, a pH control agent, a disinfecting agent, a germicidal agent, an anti-redeposition agent, an optical brightener, an anti dye transfer agent, a color protection agent, a free residual monoethanolamine, and combinations thereof; and wherein the cleaning composition is compatible with polyvinyl alcohol films; and sealing a portion of the concentrated cleaning composition within a pouch or packet formed by a water soluble film.

14. The method of claim 13, wherein preparing the concentrated cleaning composition comprises combining one or more of the constituents of the concentrated cleaning composition and mixing the combined constituents to produce a homogeneous concentrated cleaning composition.

15. The method of claim 14, wherein the concentrated cleaning composition is prepared using fatty acid methyl ester sulfonate in the form of a liquid, paste, flake, solid powder, or combinations thereof.

16. An article comprising a unit dose packet of a concentrated cleaning composition for cleaning laundry, wherein the concentrated cleaning composition consists of, based on a total weight of the concentrated cleaning composition:

from 10 wt. % to 60 wt. % of one or a plurality of nonionic surfactants;

from 2 wt. % to 20 wt. % of one or a plurality of fatty acid soaps;

from 0.1 wt. % to 3.0 wt. % of one or a plurality of enzymes;

from 5 wt. % to 50 wt. % of one or a plurality of fatty acid alkyl ester sulfonates, wherein the fatty acid alkyl ester sulfonates consist of fatty acid methyl ester sulfonates according to formula (I):

$$R—CH(SO_3M)—CO—OCH_3 \quad (I)$$

wherein R is an alkyl group and M is a cation;

from 0 wt. % to 10 wt. % of one or a plurality of chelants;

from 0 wt. % to 10 wt. % of one or a plurality of detersive polymers;

a solvent system consisting of organic solvents or organic solvents and water, wherein a concentration of the organic solvents in the concentrated cleaning composition is from 10 wt. % to 30 wt. %, based on the total weight of the concentrated cleaning composition; and at least one additive selected from the group consisting of an enzyme stabilizer, a suspended detersive agent, a fabric conditioning agent, an additional surfactant, a fragrance, an encapsulated fragrances, an opacifying agent, a colorant, an optical brightener, a pH control agent, a disinfecting agent, a germicidal agent, an anti-redeposition agent, an optical brightener, an anti-dye transfer agent, a color protection agent, a free residual monoethanolamine, and combinations thereof; and wherein the concentrated cleaning composition is compatible with polyvinyl alcohol film, wherein the unit dose packet comprises single chamber, a dual chamber, or multi-chamber unit dose packet, and at least one compartment of the unit dose packet comprises a total weight of the concentrated cleaning composition of from 15 grams to 30 grams.

17. The article of claim 16, wherein the one or a plurality of nonionic surfactants comprise fatty alcohol ethoxylates having a hydrophobic portion comprising 8 to 16 carbon atoms and a hydrophilic portion comprising from 3 to 12 moles of ethoxylate units per mole of the fatty alcohol ethoxylate.

18. The article of claim 16, wherein the concentrated cleaning composition comprises one or more secondary nonionic surfactants in addition to the fatty alcohol ethoxylates.

19. The article of claim 18, wherein the secondary nonionic surfactant comprises alkyl polyglucosides.

20. The article of claim 16, wherein the solvent system comprises water and a concentration of the water in the concentrated cleaning composition is from 5 wt. % to 20 wt. % based on the total weight of the concentrated cleaning composition.

* * * * *